United States Patent [19]

Watanabe et al.

[11] Patent Number: 5,513,857
[45] Date of Patent: May 7, 1996

[54] PISTON SEALING RING HAVING INTERLOCKING ENDS

[75] Inventors: Tetsumi Watanabe, Okazaki; Yutaka Momose, Anjo; Noboru Ohtani, Handa; Hiroyuki Katsuda, Okazaki, all of Japan

[73] Assignee: Aisin Seiki Kabushiki Kaisha, Kariya, Japan

[21] Appl. No.: 302,520

[22] Filed: Sep. 8, 1994

[30] Foreign Application Priority Data

Sep. 8, 1993 [JP] Japan ..................... 5-223304

[51] Int. Cl.$^6$ ................. F16J 9/06; F16J 9/00; F16J 9/18; F16J 15/00
[52] U.S. Cl. ............. 277/141; 277/217; 277/218; 277/220; 277/223; 277/198; 277/234; 277/103
[58] Field of Search .................. 277/141, 217, 277/218, 220, 223, 165, 198, 176, 234, 244, 105

[56] References Cited

FOREIGN PATENT DOCUMENTS 63-84459  6/1988  Japan.

Primary Examiner—William A. Cuchlinski, Jr.
Assistant Examiner—Keith Hwang
Attorney, Agent, or Firm—Oblon, Spivak, McClelland, Maier & Neustadt

[57] ABSTRACT

A sealing device for being mounted on a piston which is movably fitted within a cylinder, includes a sealing ring member having opposite end portions which are interlocked with each other along the circumferential direction of the sealing ring member, and an expanding device for expanding the radius of sealing ring member in the radial direction thereof.

9 Claims, 3 Drawing Sheets

PISTON SEALING RING HAVING INTERLOCKING ENDS

BACKGROUND OF THE INVENTION

The present Invention relates to a sealing device, and in particular to a sealing device mounted on a piston.

As disclosed in Japanese Utility Model Laid-open No. 63-84459 published in 1988 without examination, opposite end portions of a sealing ring member are connected with each other in a halving joint manner. The fluid tight connection between the opposite end portions is expected to be established, after mounting the sealing ring on the piston which is movably fitted within a cylinder, by a fluid pressure in the cylinder which acts on the sealing ring along its radially outward direction and axial direction.

It is well known that with passing of time the sealing ring wears by friction and depending on the resultant frictional wear the radius of the sealing ring expands in the radial direction. This means that the engaging area between the opposite end portions becomes small which will affect the sealing function therebetween.

SUMMARY OF THE INVENTION

It is, therefore, an object of the present invention is to provide a sealing device which is free from the foregoing drawbacks.

Another object of the present invention is to provide a sealing device wherein a minimum sealing area between opposite end portions of a sealing ring is attained or reserved.

In order to attain the foregoing objects, a sealing device for being mounted on a piston which is movably fitted within a cylinder, comprises a sealing ring member having opposite end portions which are interlocked with each other along the circumferential direction of the sealing ring member, and an expanding device for expanding the radius of sealing ring member in the radial direction thereof.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF PREFERRED EMBODIMENTS

Preferred embodiments of the present invention will be described hereinunder in detail with reference to the accompanying drawings.

Figure 1:
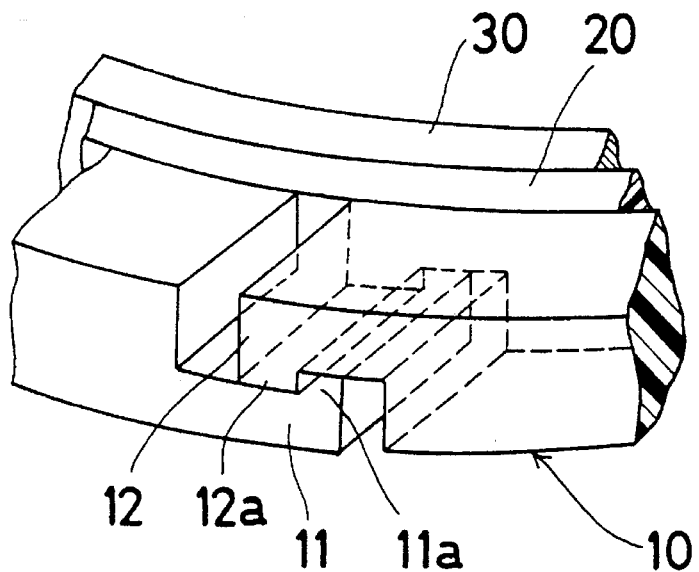
FIG. 1 is a perspective view of a partial portion of a sealing device in accordance with a first embodiment of the present invention.
Figure 2:
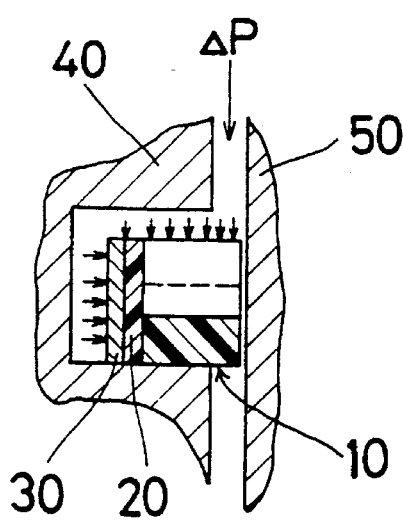
FIG. 2 is a cross-sectional view of a connecting portion of the sealing device of FIG. 1 wherein opposite end portions of the sealing device are connected.

Referring first to FIGS. 1 and 2 wherein a sealing device in accordance with a first embodiment of the present invention is illustrated, the sealing device is mounted on a piston 40 which is slidably fitted within a cylinder 50 and includes a sealing ring member 10, a backup ring member 20, and a tension or expansion ring member 30. The sealing ring member 10 is made of a lubrication-rich material such as Teflon (a tradename for polytetrafluoroethylene), and has a first end portion 11 and a second end portion 12 which confront each other. The first end portion 11 is provided with an upward projection 11a and the second end portion 12 has a downward projection 12a. The first end portion 11 and the second end portion 12 are overlapped with each other in such a manner that the upward projection 11a and the downward projection 12a are expected to be interlocked with each other in the circumferential direction as will be detailed later, The backup ring member 20, similar to the sealing ring member 10, is made of a Teflon resin. The tension ring member 30, which is made of a metal such as a stainless steel, is expected to receive a pressure $\Delta P$ within the cylinder 50. Such a pressure $\Delta P$ will expands the tension ring member 30 in the radial direction. The resultant expansion expands, via the backup ring member 20, the sealing ring member 10 in the radial direction and establishes the fluid light engagement or connection between the sealing ring member 10 and the backup ring member 20. The pressure $\Delta P$ also acts on the sealing ring member 10 and thus establishes the fluid tight engagement or connection between the projection 11a and the projection 12a.

After provision or mount of the sealing device on the piston 40, even though a gap or clearance 100 is defined between the projection 11a and the projection 12a, such a gap or clearance becomes zero. The reason is that reciprocal, sliding movements of the sealing ring member 10 along the cylinder 50 brings about a frictional wear of the sealing ring member 10, resulting in an expansion of thereof in the radial direction. Once the fluid tight engagement or connection between the projection 11a and the projection 12a has been established, the promotion of deterioration of the sealing function of the sealing ring member 10 can be prevented.

In addition, the foregoing engagement or connection between the projection 11a and the projection 12a prevents further expansion of the sealing ring member 10. Under such a condition, as a result of further friction wear of sealing ring member 10, a slight gap or clearance may be defined or generated between the sealing ring member 10 and the cylinder 50. Even though such a slight gap or clearance is generated, so long as the piston 40 reciprocates at a high speed, the fluid-tight relations hip between the piston 40 and the cylinder 50 can be maintained or ensured practically.

Figure 4:
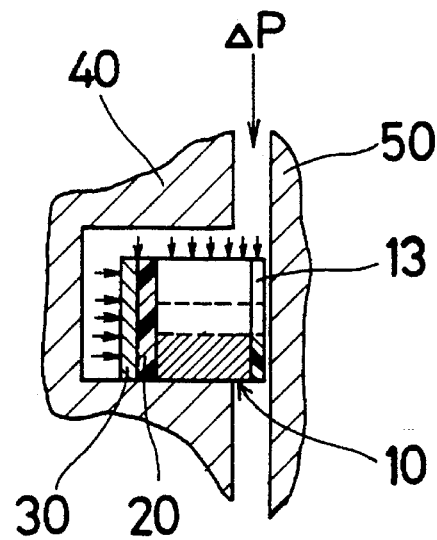
FIG. 4 is a cross-sectional view of a connecting portion of the sealing device of FIG. 2 wherein opposite end portions of the sealing device are connected.
Figure 3:
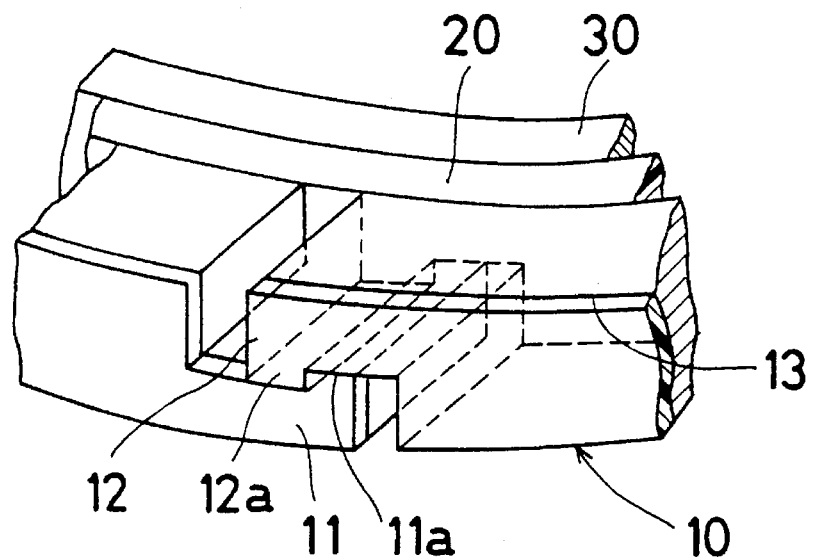
FIG. 3 is a perspective view of a partial portion of a sealing device in accordance with a second embodiment of the present invention.

In FIGS. 3 and 4, there is shown, another sealing device in which a Teflon layer 13 is provided on an outer surface of a sealing ring member 10 So as to establish further smooth sliding movement thereof along an cylinder 50. Other than such a structure, the sealing device shown in FIGS. 3 and 4 is identical with that shown in FIGS. 1 and 2.

Figure 5:
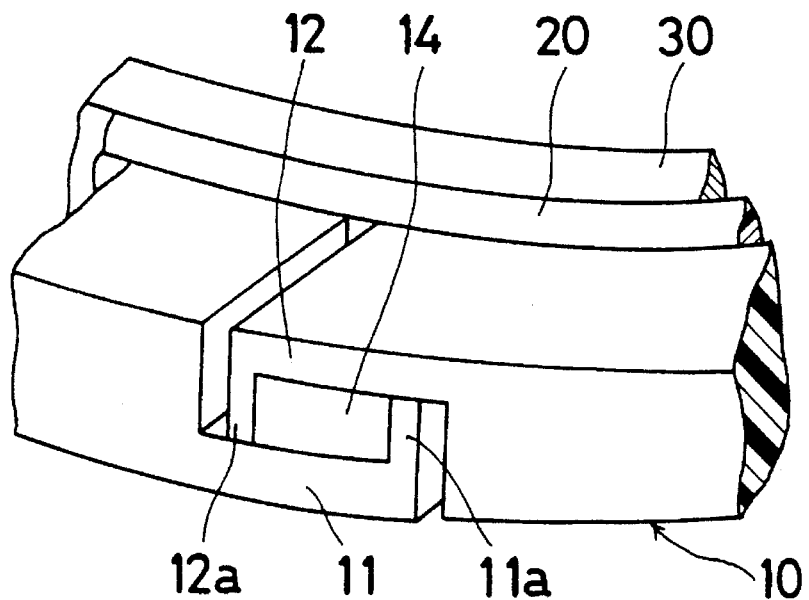
FIG. 5 is a perspective view of a partial portion of a sealing device in accordance with a third embodiment of the present invention.
Figure 6:
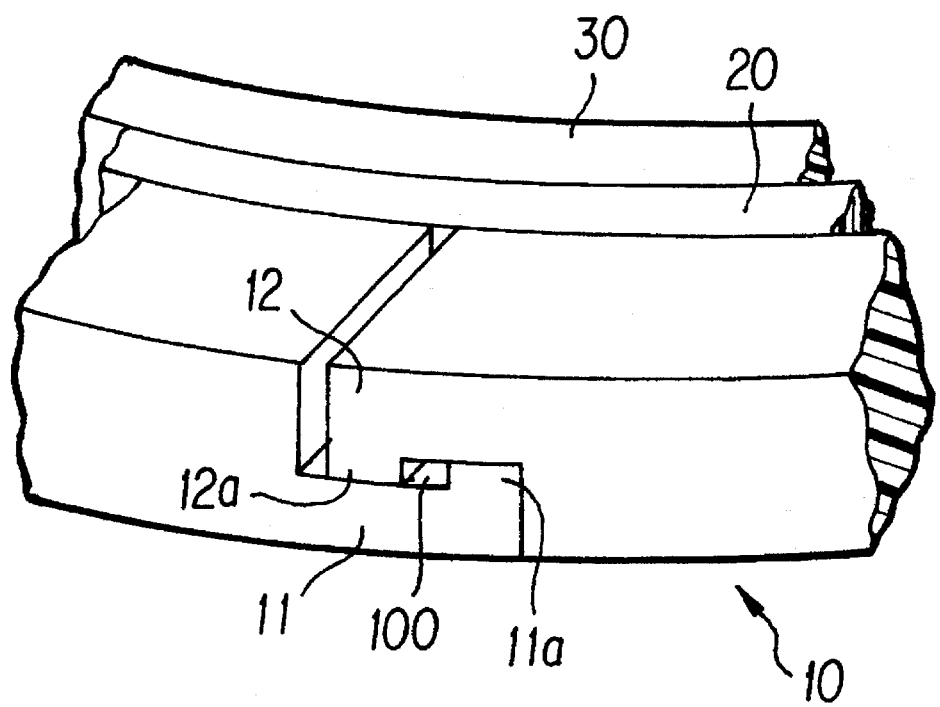
FIG. 6 corresponds to FIG. 1 but shows a gap.

As shown in FIG. 5, a spacer 14 is interposed between the projection 11a and the projection 12a. If the sealing device is mounted on the piston 40 after which the spacer 14 is removed, the radius of the sealing device can be set to be larger than that of the piston 40, which establishes an easy mounting of the sealing device on the piston 40.

The inventions has thus been shown and described with reference to specific embodiments, however, it should be noted that the invention is in no way limited to the details of the illustrated structures but changes and modifications may be made without departing from the scope of the appended claims.

What is claimed is:

1. A sealing device mountable on a piston which is movably mounted within a cylinder, the sealing device comprising:

a sealing ring member having opposite first and second end portions including projections extending in opposite directions relative to the axis of the piston when the sealing ring is mounted to the piston, said first end portion being initially spaced from said second end portion to form a gap and becoming interlocked with said second end portion when the gap becomes zero due to expansion of said sealing ring member in the radial direction of the sealing ring member resulting from reciprocal sliding movements of the sealing ring member along the cylinder; and expanding means for expanding the radius of said sealing ring member in a radial direction thereof.

2. A sealing device as set forth in claim 1 further comprising a spacer interposed between the projections.

3. A sealing device as set forth in claim 1, wherein the sealing ring member is made of a lubrication-rich material.

4. A sealing device as set forth in claim 3, wherein the lubrication-rich material is a polytetrafluroethylene.

5. A sealing device as set forth in claim 1, wherein the sealing ring member is reinforced at its inner surface by a backup ring.

6. A sealing device as set forth in claim 5, wherein the backup ring member is made of a polytetrafluroethylene.

7. A sealing device as set forth in claim 1, wherein expanding means is a metal ring member provided at an inner surface of the sealing ring member.

8. A sealing device as set forth in claim 7, a backup ring member is interposed between the sealing ring member and the metal ring member.

9. A sealing device as set forth in claim 1, wherein an outer surface is provided with a polytetrafluroethylene layer.

* * * * *